Patented May 15, 1951

2,553,226

UNITED STATES PATENT OFFICE 2,553,226

SOLDERING FLUX COMPOSITIONS

Harold R. Williams, Cleveland, Ohio

No Drawing. Application May 4, 1945,
Serial No. 592,059

3 Claims. (Cl. 148—25)

My invention relates to an improved rosin flux adapted for use in any soldering or brazing operation and relates further to an improved paste solder containing said improved flux.

Prior fluxes with which I am familiar have met with various objections when used for a variety of soldering and/or brazing purposes. For this reason, the practice has become established of employing one type of solder flux for one type of soldering operation and other types for different soldering work. As an example, a chloride flux, although a relatively fast and efficient fluxing agent, is in itself corrosive and has been found to deposit a residue which is electrically conductive. Hence, in electrical and radio work, a rosin flux which is slower in action is commonly employed. Further, in the field of soldering higher melting metals, i. e., the brazing field, borax or boric acid is the flux most commonly employed.

Each of the several fluxes mentioned have been employed in connection with various so-called "paste solders" but a successful flux with improved tinning and cleaning properties in combination with a solder, as a stable combined flux and paste solder compound, has never been attained prior to my improved composition, which is fast in its action, non-residual, stable, non-hygroscopic in character, non-corrosive, homogeneous, efficient, and non-electrically conductive.

Neither has such an improved flux been achieved of such improved characteristics, which is susceptible of universal application for a variety of soldering purposes.

I have found further in compounding the paste solders of the prior art that these have been based entirely on the use of physical mixtures of grease or wax binders such as petrolatum, "vaselene," wax, glue and like materials, none of which assist in the soldering operation but are simply binders and, in fact, are deterrents to a successful soldering technique.

In prior art compositions with which I am familiar, this type of binder has composed from 65 to 85% of the entire solder compound. Hence, the active fluxing ingredients normally average only 26% and the effectiveness is limited thereby.

One of the objects of my invention is to provide a rosin solder flux which will be of such consistency as to provide a good surface film for the metals to be soldered and which is non-hygroscopic in character, being a homogeneous and stable compound of substantially either a cream or thick plastic paste consistency.

Another object of my invention is to provide such an improved flux which may be combined with solder agents to form a homogeneous paste flux and solder.

Another object of my invention is to provide an improved paste mixture in which all ingredients of the composition cause the solder to act with improved efficiency and according to good soldering technique.

A further object of my invention is to achieve such an intimate mixture between the respective components of my composition as to prevent any breakdown of the composition as would impair its usefulness.

Still further objects of my invention involve the provision of an improved paste solder and rosin flux compound which will perform the initial cleaning of the surfaces to be soldered, as well as the fluxing, tinning and soldering thereof.

My improved composition involves basically the reaction or combination of aluminum stearate with natural gum rosin containing abietic acid although various natural resins may be employed.

I have found that when so reacted or combined, the aluminum stearate dissolves the rosin and appears to hold the rosin in film suspension and increases the activity of the rosin by raising the melting temperatures thereof out of and beyond the ordinary rosin flux active temperature field which is between 350° and 500° F. to from 200° F. to above 750° F. when combined with low melting solder metals and above this temperature and up into the brazing field when combined with higher melting temperature solder metals.

It appears that the efficacy of this flux is due to the suspension of the resin within the aluminum stearate solution and its continued activity throughout its entire melting period, and the higher the evaporation point of any preferred solvent other than the stearate used with the same, the longer the fluxing action continues.

The improved flow of the flux of my invention and the controlled surface tension attributed by me to the stearate and the union of these two factors under controlled temperatures, enables the flux to act efficiently without destructive action.

Also, rosin, because of the increased activity thereof, may be used in exceedingly small amounts to effect a highly efficient fluxing action or in larger quantities as may be desired for increased activity.

The basic ingredients of my invention are utilized in the production of my improved flux as will be apparent from the following description of certain preferred forms of my invention.

"A" rosin flux

| Ingredients: | Percent |
|---|---|
| Rosin | 20 to 85 |
| Metal stearate and solvent (turpentine) | 80 to 15 |

As will be described hereinafter and as it can be discovered from an analysis of the preferred range of proportions illustrated in the examples herein, I can produce a flux which may be either a light cream paste consistency, or a heavy plastic paste consistency and the quantity and type of solvent will, to a large extent, determine the liquidity thereof. This is useful as it may be desired for certain purposes to employ a relatively more fluent or less fluent paste flux solder or flux.

Hence, an extremely valuable and efficient combined solder and flux may be produced with excellent surface tension, and good homogeneous character throughout, the distribution of the solder throughout the flux being uniform throughout the soldering and fluxing process. Hence, clean smooth soldered surfaces are achieved by this combined flux and solder.

It will be noted that the metal stearate in the above flux of formula "A" is aluminum stearate.

"B" variant high stearate flux

| Ingredients: | Percent |
|---|---|
| Rosin | 2 to 10 |
| Stearate and solvent (turpentine) | 98 to 90 |

The solvent, referred to in the above formulas "A" and "B" is preferably turpentine, as stated, and the percentage of such solvent employed will be preferred in a range of 30% to 75% of the totals combined stearate and solvent. Alcohol or ethylene glycol or other amine could be substituted for the turpentine as the solvent in the above example, but in such event, the amount of solvent required would be less, and the proportion of rosin and stearates would be increased, but the same relative proportions between the rosin and stearate would be maintained.

To produce the flux of either the "A" or the "B" example, the rosin is preferably reduced, by means of heat, to a plastic state and the solvent and metal stearate solution is then added without heat to further reduce the same to a completely liquid state. The resultant solution of rosin and stearate and solvent is further mixed until final emulsification occurs, whereupon the emulsion is permitted to stand and a flux is produced which becomes a viscous paste-like transparent substance, stable in composition, nonhygroscopic in character, and suitable for use as a paste solder.

This flux, when applied to the metals to be soldered, affords good coverage and may be applied thereto by various methods, hand or automatic feed being contemplated, spreading over the surface to be soldered sufficiently upon heating to produce a surface film therefor to protect the metal surfaces from oxidation.

The said film is maintained throughout the soldering process with good surface tension whereby the rosin is enabled to operate as a good flux without flowing away from the heat or producing a resinous residue. Furthermore, it has been found that in this improved flux the stearate enables the rosin to withstand a much higher temperature in soldering than was heretofore possible, the flux being active in film-like consistency up to a temperature of around 750° F.

This flux has been found to combine with solder particles, such as comminuted or granulated metal to a greater extent than any paste solder of the prior art. For example, the flux has been found capable of absorbing up to 90 times its weight of solder and a virtual plastic rubber like paste solder may thus be produced which is extremely efficient for "spot soldering" in electrical work.

I have found that either the "A" or the "B" flux may be varied by combining them with any liquid flux, such as a chloride flux or other halide fluxing agent, or soldering salts, by simply adding a quantity thereof to the above fluxes. I have found that a preferred amount of $ZnCl_2$ etc., ($NH_4Cl$ or the like) is 10 to 80% of the total mix in such fluxes.

It will be noted that metal stearates may be used in varying proportions in the fluxes of my invention as may be desired, with gum rosin to operate as effectively as the above examples with the additive factor of a preferred solvent. If a metal salt of the stearate be used with a solvent, for example, a terpene, the result is a rosin flux with improved operating characteristics. In all formulas noted above, the rosin or metal stearate quantity may be raised or lowered as the other is lowered or raised, the solvent used being varied as may be desired within the range discussed in connection with the aforesaid examples.

When the liquid flux is added to the above example fluxes, I preferably utilize $ZnCl_2$ or $NH_4Cl$ in solution, dissolving the aluminum stearate therein, and then, add the gum rosin and neutral oil or rosin oil, under heat, the same quickly melting into the chloride.

The mixture is then agitated and a stable viscid paste emulsion formed. It will be noted that for zinc chloride or ammonium chloride may be substituted various halogens in lieu of chlorine in combination with various metals, such as Zn, Sn, Pb, etc.

In each formula, moreover, the resin employed may be gum rosin in its crystalline state as a vitreous substance or a heavier fraction of the distillation of rosin, as a "rosin oil," or other resinous substance or related terpenes.

It is a fact which I have established by repeated experiments that a flux constituted according to the aforesaid formulas and produced by the process stated, is remarkably efficient and possesses none of the disadvantages of a chloride flux as heretofore experienced in the art. The stearate appears to prevent any corrosion or oxidation common to chloride fluxes and further imparts a high film strength and uniformity to the flux, whereby, upon the emulsion being formed, the chloride or like fluxing agent employed in combination with the resin or the resin alone is enabled to operate efficiently as a fluxing agent.

As described in connection with the improved flux of Formula "A," comminuted particles of solder metal may be added to any of the flux compositions herein described, "B" or alternate forms where liquid flux, etc., is employed, to form a satisfactory combined solder and flux paste, and the consistency of such improved paste solder and flux compounds is such that the same may be applied directly to the metals to be soldered either by a tube dispensing instrumentality or other tool, thus eliminating the soldering iron, and heat may be applied to the same by any preferred means; thereupon, the solder and flux compound will operate to initially clean the surfaces to be soldered, actively flux the surfaces, tinning and soldering thereafter. All of these operations are visibly simultaneous and the resultant solder joint is clean and does not show any deleterious residue and any of the above compounds may be utilized for any type of soldering work.

This paste solder and flux compound is moreover, it will be noted, composed largely of active fluxing agents and only a small proportion of the compound is represented by the vehicle, and the vehicle used has been found to aid in soldering and does not damage the solder in any way.

It has been found that the improved paste solder and flux compound of my invention, as above described, is active between temperatures of 200° to 750° F., and hence, is extremely efficient in the low melting field. In the field of brazing, it has been found that the compound may be employed by using higher melting alloys as the solder constituent of the composition and higher melting metals.

Other uses and varying formulas may be found which might represent a departure from the preferred embodiments herein illustrated and described without however departing from the spirit of my invention and the scope of the appended claims.

I claim:

1. A soldering flux consisting of gum rosin, aluminum stearate and a non-aqueous solvent.

2. A soldering flux consisting of gum rosin, aluminum stearate, and a solvent for the gum rosin and stearate.

3. A soldering flux consisting of zinc chloride, aluminum stearate, gum rosin and a rosin oil.

HAROLD R. WILLIAMS.

REFERENCES CITED

The following references are of record in the file of this patent:

UNITED STATES PATENTS

| Number | Name | Date |
|---|---|---|
| 354,843 | Smith | Dec. 21, 1886 |
| 812,494 | Hussey | Feb. 13, 1906 |
| 923,934 | Benson | June 8, 1909 |
| 1,757,118 | Harris | May 6, 1930 |
| 1,882,735 | Barber | Oct. 18, 1932 |
| 1,927,355 | Aston | Sept. 19, 1933 |
| 1,929,895 | McBride | Oct. 10, 1933 |
| 2,029,288 | Bray | Feb. 4, 1936 |
| 2,040,098 | Miller | May 12, 1936 |
| 2,169,659 | Noble et al. | Aug. 15, 1939 |

FOREIGN PATENTS

| Number | Country | Date |
|---|---|---|
| 85,904 | Switzerland | July 16, 1920 |